US009266392B2

(12) United States Patent
Brøndum (10) Patent No.: US 9,266,392 B2
(45) Date of Patent: Feb. 23, 2016

(54) CASTOR CONTROL SYSTEM (71) Applicant: Peter Brøndum, Louisville, KY (US)

(72) Inventor: Peter Brøndum, Louisville, KY (US)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 14/358,111

(22) PCT Filed: Nov. 13, 2012

(86) PCT No.: PCT/DK2012/000120
§ 371 (c)(1),
(2) Date: May 14, 2014

(87) PCT Pub. No.: WO2013/071932
PCT Pub. Date: May 23, 2013

(65) Prior Publication Data
US 2014/0324315 A1 Oct. 30, 2014

(30) Foreign Application Priority Data

Nov. 14, 2011 (DK) .................................. 2011 00890

(51) Int. Cl.
B60B 33/00 (2006.01)
B60B 33/02 (2006.01)

(52) U.S. Cl.
CPC .......... *B60B 33/0092* (2013.01); *B60B 33/021* (2013.01); *B60B 33/0042* (2013.01);
(Continued)

(58) Field of Classification Search
None
See application file for complete search history.

(56) References Cited

U.S. PATENT DOCUMENTS 4,080,809 A * 3/1978 Ross ............................ 68/12.01
7,200,894 B2 * 4/2007 Block et al. .................... 16/18 R
(Continued)

FOREIGN PATENT DOCUMENTS

DE 101 05 614 A1 7/2002
EP 0 618 088 A2 10/1994
(Continued)

OTHER PUBLICATIONS

International Search Report and Written Opinion from PCT/DK2012/000120 mailed Mar. 28, 2013.
(Continued)

*Primary Examiner* — Thomas Tarcza
*Assistant Examiner* — Richard Goldman
(74) *Attorney, Agent, or Firm* — Dykema Gossett PLLC (57) ABSTRACT A system for controlling at least two castors (1) in a castor control system (28) is provided. The castor comprises a brake activator (7) which can be used to set the castor (1) in three different positions: directional lock, neutral or braked. The brake activator (7) can be operated manually, e.g. by foot, or via a servo motor assembly (14) having a servo motor connected to the brake activator of the castor. The servo motor assembly further comprises a printed circuit board (16), a microprocessor (17) and at least one switch (19,20) connected to the brake activator (7). The servo motor assembly can further comprise a motion sensor (18). The servo motor assembly of each castor is connected to an electric brake controller (33) of the castor control system. The castors can be operated from an operating panel (37) of the castor control system (28). If the brake activator (7) of one castor is manually operated, the electric brake controller (33) can be set to let one or more of the other castors of the system assume the same position. The system can also set all castors (1) in the braked position if the motion sensor (18) detects motion of the castors (1) and the system is connected to mains voltage (40).

15 Claims, 4 Drawing Sheets (52) U.S. Cl.
CPC ......... *B60B33/0049* (2013.01); *B60B 33/0057* (2013.01); *B60B 33/0068* (2013.01); *B60B 33/028* (2013.01); *B60B 2200/242* (2013.01)

(56) References Cited

U.S. PATENT DOCUMENTS

| | | | |
|---|---|---|---|
| 2002/0175018 A1 | 11/2002 | Strong | |
| 2006/0102392 A1* | 5/2006 | Johnson et al. | 180/19.1 |
| 2007/0056141 A1* | 3/2007 | Armano et al. | 16/35 R |
| 2011/0010892 A1* | 1/2011 | Von Bordelius et al. | 16/35 R |
| 2011/0120815 A1* | 5/2011 | Frolik et al. | 188/1.12 |
| 2011/0272200 A1* | 11/2011 | Clapp et al. | 180/54.1 |
| 2012/0054983 A1* | 3/2012 | Steenson | 16/47 |
| 2013/0160237 A1* | 6/2013 | Shih | 16/47 |
| 2013/0227787 A1* | 9/2013 | Herbst et al. | 5/611 |
| 2014/0324315 A1* | 10/2014 | Brondum | 701/70 |

FOREIGN PATENT DOCUMENTS

| | | |
|---|---|---|
| GB | 2 457 787 A | 9/2009 |
| WO | 02055322 A1 | 7/2002 |
| WO | 2007054037 A2 | 5/2007 |
| WO | 2008148169 A1 | 12/2008 |

OTHER PUBLICATIONS

International Preliminary Report on Patentability from PCT/DK2012/000120 mailed May 20, 2014.

* cited by examiner

CASTOR CONTROL SYSTEM

CROSS-REFERENCE TO RELATED APPLICATIONS

This application is a national stage filing based upon international application no. PCT/DK2012/000120, filed 13 Nov. 2012 (the '120 application), and published in English on 23 May 2013 under international publication no. WO 2013/071932, which claims priority to Denmark (DK) patent application no. PA 2011 00890, filed 14 Nov. 2011 (the '890 application). The '120 application and the '890 application are both hereby incorporated by reference as though fully set forth herein.

The present invention relates to a castor control system and methods for operating such a system.

Castors usually comprise a fork from which a mounting pin projects vertically. In the fork a running wheel is mounted via a horizontal axle. The fork can swivel about the vertical axis of the mounting pin and the running wheel can rotate about the horizontal axis of its mounting axle. Mounted on hospital and care furniture, the castors are normally equipped with means for locking the swivel and means for braking the wheel. These means can be applied either alone or in combination. Such a castor is described in GB 2 457 787 to Oy Mannerin Konepaja AB.

In hospital beds the brake and locking means are normally mechanically interconnected such that they can be operated via a pedal. Such a bed is disclosed in EP 618 088 A2 to Hill-Rom. A further development of this principle is described in EP 1 945 166 A2 to LINET SPOL S.R.O. Here, the undercarriage of a hospital bed comprises a common control of the castors which can be operated by a common actuation device. The undercarriage comprises a bed movement sensor and a central processor unit. If the hospital bed has not been moved for a specified period of time, the central processor unit will automatically apply the brakes of the castor wheels by means of the common actuation device. The braking and/or locking of the undercarriage is easier with the use of the common actuation device. However, adding, the common actuation device to the mechanically interconnected castors merely increases the total weight of the undercarriage, which makes it very heavy to move around and to maneuver.

GB 2 457 787 to Oy Mannerin Konepaja AB describes a castor with a swivel lock and a wheel brake having a common activation shaft. In a first position the common activation shaft locks the swivel. In a second position the activation shaft locks the swivel and activates the wheel brake. Each castor includes a pedal for manual operation. In another embodiment the pedal is replaced with a motor actuator, such as an electric motor mounted thereon. Manual operation of the pedal or actuation of the motor will cause the common activation shaft to move between the positions mentioned. Although the castor with the motor actuator is convenient in use, it can be problematic if there is no power available or if the control system fails.

This drawback is overcome in WO 2008/148169 A1 to Fallshaw Holdings PTY LTD which discloses a castor having a brake activator which can be set in three different positions to put the castor in a directional lock, neutral or braked position. In the first position (directional lock) the castor is not able to swivel about a vertical axis, but the wheels of the castor can rotate freely about a horizontal axis. Hereby the castor can only move in one direction. In the neutral position the castor can swivel about a vertical axis and the wheel can rotate freely about a horizontal axis, hence the castor can be moved in any direction. In the braked position the castor cannot swivel about the vertical axis nor can the wheels rotate about the horizontal axis. Thus, the castor is immovable. The castor can be equipped with an electronic brake activator connected to the brake activator of the castor. The three positions can thereby be reached by activating the brake activator via the electric brake activator. Hence, the castor can be operated both manually and automatically.

The objective of the invention is to provide an improved castor control system with an increased reliability, usability and safety.

According to the invention this is solved by providing a castor comprising a mounting pin with a vertical rotational axis about which the castor can swivel, at least one wheel rotatable about a horizontal axis (6), and a brake activator cooperating to set the castor in: a directional lock position where the castor cannot swivel about the vertical axis of the mounting pin and the wheel can rotate freely about the horizontal axis, or a brake position where the wheel cannot rotate about the horizontal axis and where the castor cannot swivel about the vertical axis of the mounting pin, or a neutral position where the castor can swivel freely about the vertical axis of the mounting pin and the wheel can rotate freely about the horizontal axis.

The castor is characterized in that it further comprises a servo motor assembly comprising a servo motor, a printed circuit board, a microprocessor and at least one switch, and where the servo motor is connected to the brake activator. The castor can thus be operated both manually and automatically. Moreover, the castor is able to give a status on the position of the brake activator. In a further embodiment the castor comprises a motion sensor. Hereby, the castor can provide a status on whether it is in motion or not.

The present invention further provides a castor control system comprising at least two castors of the above mentioned type and where the castor control system further comprises an electric brake controller, a power supply and an operating panel. The electric brake controller of the castor control system can also comprise a microprocessor. The castor control system thus provides control of the castors either individually, in pairs or as a plurality. Combined with the ability to give the status of the position of the brake activator of each castor, this provides a wide range of possibilities for usability and safety, which will be described in the following.

According to a method of the present invention the electric brake controller of the castor control system can set the operating panel to indicate the position of the brake activator of each of the castors. Hereby, the user can ensure that the brake activator of each castor is set in the intended position.

According to a method of the present invention the electric brake controller of the castor control system can set the castors in the brake position if the brake activator of one of the castors has been manually set in the brake position. This greatly increases the ease of using the castors in the castor control system. If the castor control system is installed in an article of hospital or care furniture, a caretaker can within a few seconds brake all castors by operating the brake activator of only one castor. Within a moment the caretaker can ensure that the braking position of all castors has been reached by reading off the operating panel, which can indicate the position of the brake activator of each castor in the castor control system.

According to a method of the present invention the electric brake controller of the castor control system can set at least one of the castors in the directional lock position if the brake activator of one of the other castors has been manually set in the directional lock position. This eases the use of the castor control system. If the castor control system is installed in an article of hospital or care furniture, a caretaker moving the article of furniture can hereby obtain control of the article of furniture during motion by having either the front or rear pair of castors set in a directional lock position. To ensure that the intended position of the brake activator of each castor in the castor control system has been reached, the caretaker can simply read off the operating panel which indicates the position of the brake activator of each castor.

In a further embodiment of the castor control system, the electric brake controller comprises a voltage source detector to determine whether or not the castor control system is connected to mains voltage. According to a method of the present invention the electric brake controller of the castor control system can set the brake activator of each of the castors in the brake position if the motion sensor of one or more castors detects motion and the castor control system at the same time is connected to mains voltage. In the case that the castor control system is installed in an article of hospital or care furniture the mains power supply is normally provided via a cable with a plug connected to a wall socket. The castor control system will here prohibit that this cable is ripped out of the wall thus avoiding damages to equipment and personal injury. In addition hidden damages to the cable, such as cutting off conducting wires or short circuiting of the conducting wires, caused by tearing out the cable of the wall are also avoided.

The present invention further provides an article of hospital or care furniture comprising a castor control system as described above.

The present invention also relates to a patient lift comprising a castor control system as described above.

Further characteristics of the present invention are described in the following, where.

Figure 1:
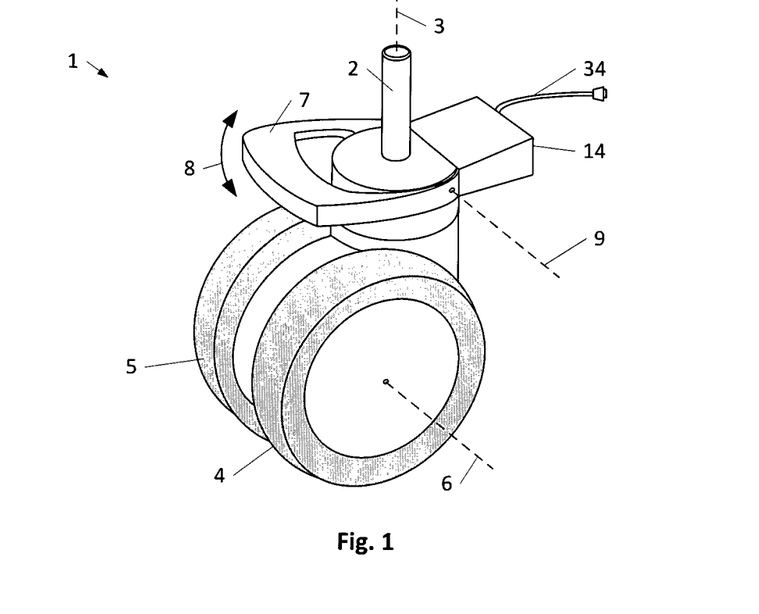
FIG. 1 illustrates a castor.
Figure 2:
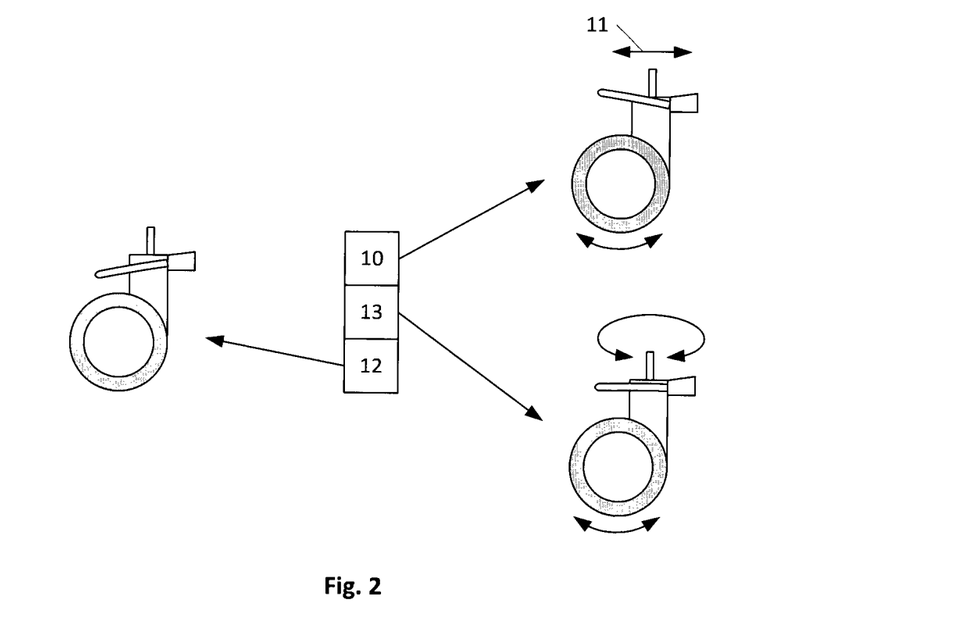
FIG. 2 illustrates the three positions, in which the brake activator of the castor in FIG. 1 can be set, FIG. 3 schematically illustrates the inside of a servo motor assembly, FIG. 4 schematically illustrates a castor control system comprising four castors of the type illustrated in FIG. 1.

FIG. 1 illustrates a castor 1 with a mounting pin 2 having a vertical rotational axis 3 about which the castor 1 can swivel. The castor 1 comprises a set of wheels 4,5 which can rotate about a horizontal axis 6. A brake activator 7 is arranged above the wheels 4,5 and can be set in three different positions by pivoting it up and down as indicated by the arrow 8 about the axis 9. As illustrated in FIG. 2 in the upper position 10 (directional lock) the castor 1 is locked in a given direction 11. This means that the wheel 4,5 can rotate freely, however the mounting pin 2 is locked in a preferred direction. This allows the castor 1 to travel along a surface in the direction 11. If the brake activator 7 is set in the lower position 12 (Braked), the castor 1 will be fully locked or braked. This means that the castor 1 cannot swivel about the vertical axis 3 of the mounting pin 2 and the wheels 4,5 cannot rotate about the horizontal axis 6. Hence, the castor 1 is completely immovable. Setting the brake activator 7 in the middle position 13 (neutral) will allow the castor 1 to swivel freely about the vertical axis 3 of the mounting pin 2 and the wheels 4,5 to rotate freely about the horizontal rotation axis 6.

Figure 3:
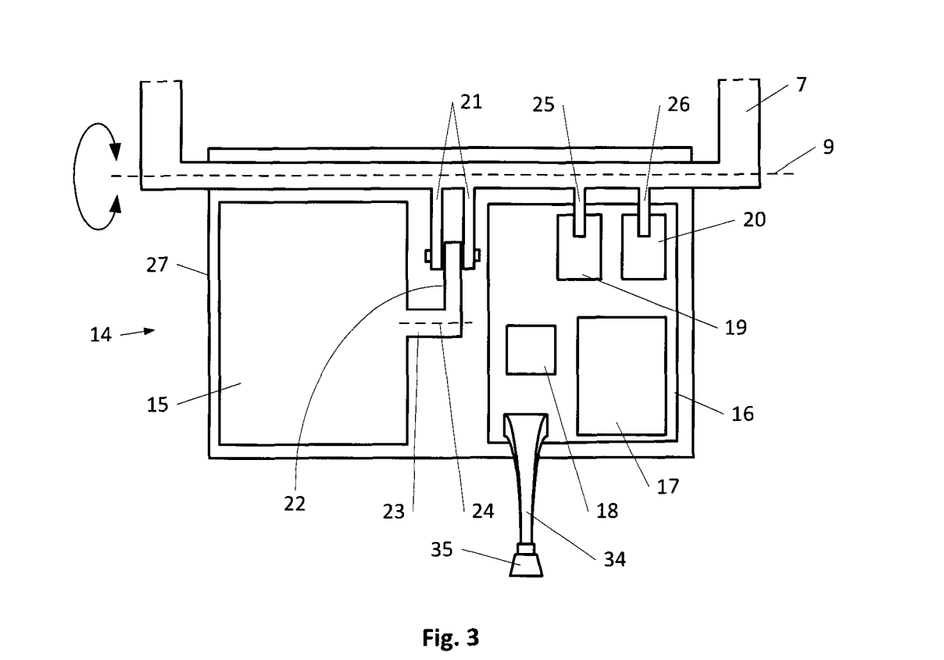

The brake activator 7 of the castor 1 is connected to a servo motor assembly 14. As illustrated schematically in FIG. 3 the servo motor assembly 14 comprises a servo motor 15, a printed circuit board (PCB) 16, a microprocessor 17, a motion sensor 18, and two switches 19,20. The motion sensor 18 could for example be an accelerometer. The servo motor 15 is coupled to the brake activator 7 either directly or indirectly via a transmission, such as a gear, or via a lever arm embodied as a fork 21. The fork 21 is in engagement with a lever arm 22 of the motor axle 23 of the servo motor 15. When the motor axle 23 is rotated about the axis 24, the brake activator 7 can be set in one of the three positions described above, namely directional lock 10, neutral 13, and braked 12. The two switches 19,20 are arranged such that they can be activated and deactivated by one of the three positions in which the brake activator 7 can be set via the pins 25,26. The switches 19,20 are connected to the microprocessor 17 which can receive the signal generated by the switches 19,20. The servo motor assembly 14 is housed in a closed cabinet 27.

Figure 4:
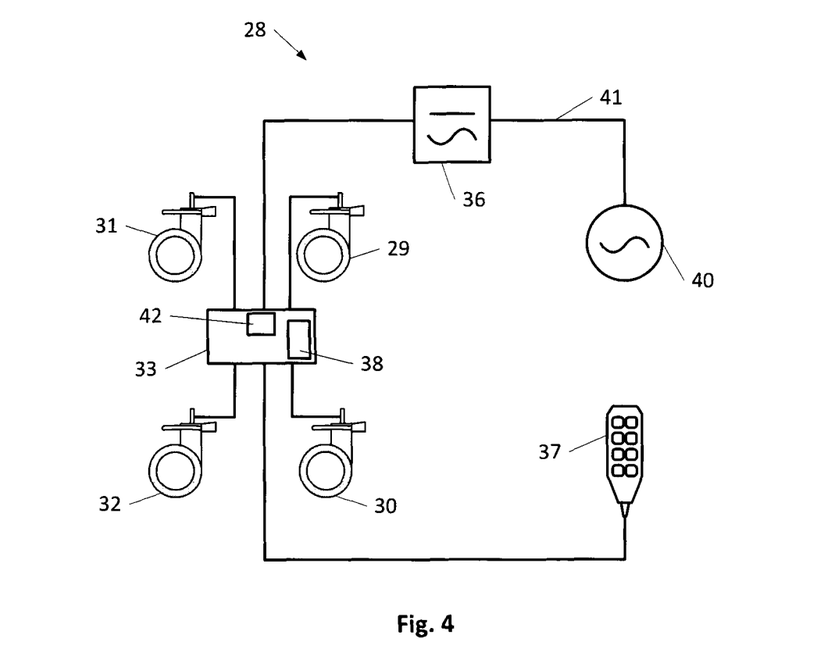

FIG. 4 schematically illustrates a castor control system 28 comprising four castors 29,30,31,32 of the castor 1 type with the servo motor assembly 14 described above. The castor control system 28 could purposefully be utilized when mounted in an article of hospital or care furniture (see FIG. 6) or a patient lift (see FIG. 7). Each of the castors 29,30,31,32 is connected to the electric brake controller 33 via the connector cable 34 having a plug 35 (see FIG. 3). The electric brake controller 33 is connected to the power supply 36 and the operating panel 37, and comprises a microprocessor 38.

All four castors 29,30,31,32 can be set in the locked position 12 either via the operating panel 37 or by manually setting one of the castors 29,30,31,32 in the locked position 12. In the former situation the signal from the operating panel 37 is forwarded to the electric brake controller 33 which, via the servo motor assembly 14, sets the brake activator 7 of each castor 29,30,31,32 in the locked position 12. This will also cause the brake activator 7 to be set in the locked position 12. In the latter situation an operator such as a caretaker or hospital porter manually presses the brake activator 7 of for example castor 29 into the locked position 12. The change in the position of the brake activator 7 is registered by the switches 19,20. This information is forwarded to the electric brake controller 33 by a microprocessor 17 of the servo motor assembly 14 of the castor 29. Having processed this information the electric brake controller 33 commands the remaining three castors 30,31,32 also to be set in the locked position 12.

In a similar way all four castors 29,30,31,32 can be set in the neutral position 13 either via the operating panel or by manually setting just one of the castors 29,30,31,32 in the neutral position 13.

When the castor control system 28 is mounted in an article of hospital or care furniture it is required that one pair of castors 29,30;31,32 can be set in the directional lock position 10. This will allow the operator to better move the article of hospital or care furniture from one place to another. Also here the castors 29,30,31,32 can operated via the operating panel 37 or by manually operating one of the castors 29,30,31,32 which is to be set in the directional lock position 10. In the latter situation the operator manually presses the brake activator 7 of one of the castors 29,30,31,32, for example 29, into the directional lock position 10. The change in the position of the brake activator 7 of the castor 29 is registered by the switches 19,20. This information is processed by the microprocessor 17 and forwarded to the electric brake controller 33 by the servo motor assembly 14 of the castor 29. Having processed this information the electric brake controller 33 commands the other castor 30 also to be set in the position directional lock 10. For obtaining an optimal control of the hospital or care furniture the two remaining castors 31,32 are set in the neutral position 13. In an analogous manner the pair of castors 31,32 could also be set in the directional lock position 10 and the other pair of castors 29,30 set in the neutral position 13.

With the purpose of increasing the safety, the castor control system 28 installed in the article of hospital or care furniture could also be programmed with a brake time delay for setting all the castors 29,30,31,32 in the locked position 12 if the hospital or care furniture has not been in motion in a prescribed period of time. The present invention is using castors 1,29,30,31,32 which each are equipped with a motion sensor 18. This improves the reliability of the castor control system 28 as the castor control system 28 delay can receive and optionally compare data from all motion sensors. Furthermore, the electric brake controller 33 receives feedback from each of the castors 29,30,31,32 as to whether they have reached the commanded and thereby intended position. If this is not the case the castor control system 28 could provide an audible/visible/tactile alarm via the electric brake controller 33 and/or the operating panel 37.

This feedback loop can be applied to all positions 10, 12, 13 in which the castor 1 (and hence the brake activator 7) can be set. The position of the brake activator 7 is registered by the microprocessor 17 via the switches 19,20 of the servo motor assembly 14. This information is processed by the microprocessor 17 and forwarded to the microprocessor 38 of the electric brake controller 33. If the brake activator 7 and thereby the castor 1 is not in the intended position, this information can be provided as an alarm to an operator, visually, auditory and/or tactile, or a combination of the three for example via the electric brake controller 33 and/or the operating panel 37. The position status of the brake activators 7 of each of the castors 29,30,31,32 can also be indicated on the operating panel 37.

As illustrated in FIG. 4 the electric brake controller 33 is connected to the power supply 36. The electric brake controller 33 can optionally be supplied with power from a mains voltage source 40 via a cable 41 inserted in a wall socket. In the case that the article of hospital or care furniture comprising the castor control system 28 is moved without being disconnected from the mains 40, the cable 41 could cause a dangerous situation for people or equipment in proximity of the article of furniture. Further, if the cable 41 is pulled out of the wall socket this could damage the wall socket and the plug of the cable could hit people or equipment in proximity thereof. Even worse, hidden damages to the cable 41 could be caused by tearing out the cable 41 of the wall. Such damages could e.g. be cutting the conducting wires of cable 41 or damaging the isolation of the conducting wires such that a short circuit could occur. Consequently, the electric brake controller 33 comprises a voltage source detector 42 for determining whether the electric brake controller 33 is connected to mains voltage 40.

If the voltage source detector 42 detects that the electric brake controller 33 is connected to mains voltage 40 and a motion sensor 18 in at least one of the castors 29,30,31,32 registers motion, the castor control system 28 provides a visual/audible/tactile alarm and/or sets the castors 29,30,31, 32 in the braked position 12. By disconnecting the electric brake controller 33 from mains voltage 40, the hospital or care furniture can be moved without triggering the alarm or the brake activation. The castor control system 28 could be connected to a motion sensor placed elsewhere. In this situation the servo motor assembly 14 of the castors 29,30,31,32 need not comprise a motion sensor. Hereby, a cheaper servo motor assembly 14 can be used.

During movement of an article of hospital or care furniture equipped with the castor control system 28 personnel might unintentionally strike the brake activator 7 of one of the castors 29,30,31,32 and set it in the brake position 12 (FIG. 2). In this situation the castor control system 28 can be designed to immediately bring the castor 29,30,31,32 back to the previous position either directional lock 10 or neutral 13 (see FIG. 2). This functionality could be provided in the following way: One or more of the motion sensors 18 of the servo motor assembly 14 of the castors 29,30,31,32 registers that the hospital or care furniture is in motion. This information is continuously forwarded to the electric brake controller 33 via the microprocessors 17 of each of the servo motor assemblies 14. When the brake activator 7 of one of the castors 29,30,31,32 is unintentionally set in the brake position 12 (see FIG. 2) this is immediately registered by the switches 19,20 of the servo motor assembly 14 and the information is forwarded to the electric brake controller 33, as described above. In response, the electric brake controller 33, via the servo motor assembly 14, sets the brake activator 7 in its previous position. This functionality could also be decentralized to each servo motor assembly 14. Here the electric brake controller 33 commands each servo motor assembly 14 to maintain the current position of the brake activator 7. If the switches 19,20 registers that the brake activator 7 is set in a different position, the microprocessor 17 will command the servo motor 15 to bring the brake activator 7 back to the previous position. For both situations it is not required that the brake activator 7 reaches the other position, but merely that it is brought out of its intended position. This intermediate position will also be registered by the switches 19,20 and cause the electric brake controller 33 and/or the microprocessor 17 to react as described. Also here the castor control system 28 could be connected to a motion sensor placed elsewhere. Hence, the servo motor assemblies 14 of the castors 29,30,31,32 need not comprise a motion sensor. Hereby, a cheaper servo motor assembly 14 can be used.

Figure 5:
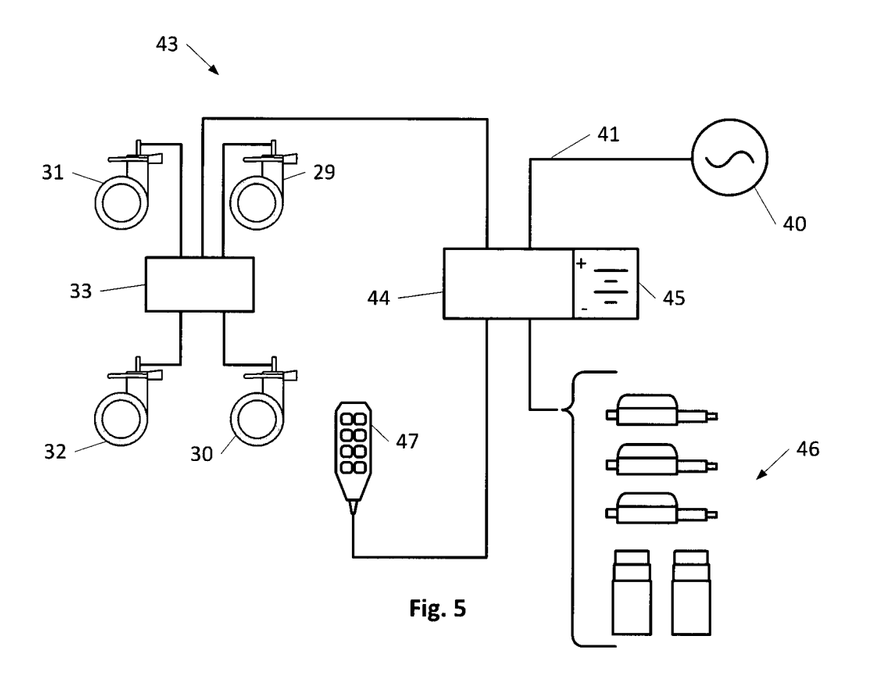
FIG. 5 illustrates a linear actuator system incorporating a castor control system of the type illustrated in FIG. 4.

FIG. 5 illustrates the castor control system 28 incorporated in a linear actuator system 43. The linear actuator system 43 comprises a control box 44 supplied with power from a battery 45 or mains voltage 40. The linear actuator system 43 further comprises a number of linear actuators 46 and an operating panel 47 both connected to the control box 44. The electric brake controller 33 is connected to and powered by the control box 44. The castor control system 28 can hereby be controlled by the operating panel 47 via the control box 44. Through the same connection the electric brake controller 33 can provide feedback to the control box 44. In the linear actuator system 43 the control box 44 operates as a master and the electric brake controller 33 as a slave. Although not illustrated the linear actuator system 43 could also comprise an additional operating panel. The linear actuators 46 are of a type comprising a thrust rod. This type of linear actuator comprises a spindle with a spindle nut. The spindle is driven by a reversible electric motor through a transmission. When the spindle is driven, the spindle nut is moved in an inwards or outwards direction depending on the direction of rotation of the electric motor. The linear actuator is a separate product with the spindle, transmission and electric motor enclosed in a housing. The housing typically consists of a motor housing and an outer tube. An inner tube is secured to the spindle nut. The inner tube is displaced in and out of the outer tube as the spindle nut is moved in and out on the spindle. In the opposite end of the spindle nut the inner tube comprises a front mounting. The outer side of the motor housing is furnished with a rear mounting. The front mounting and rear mounting are used to secure the linear actuator in the structure which should be adjusted.

Figure 6:
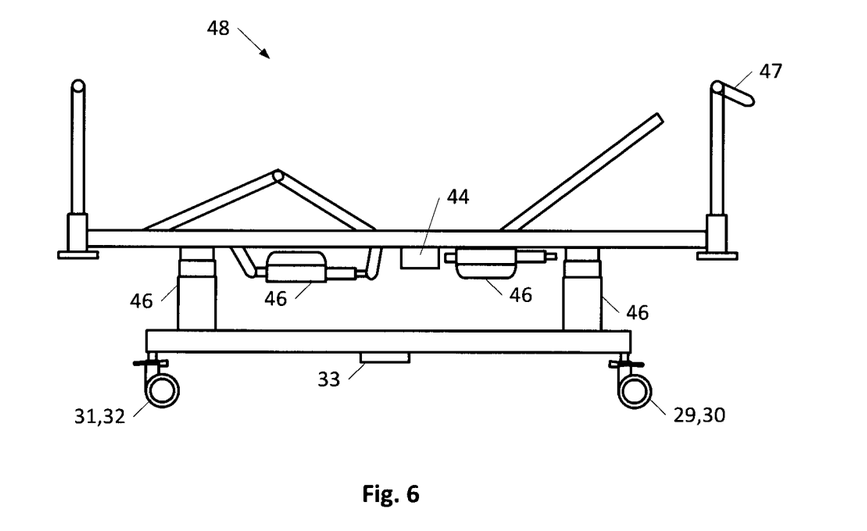
FIG. 6 illustrates a hospital or care bed incorporating the linear actuator system illustrated in FIG. 5.

FIG. 6 schematically illustrates a hospital or care bed 48 incorporating the linear actuator system 43 shown in FIG. 5. Although not shown the hospital or care bed 48 comprises four castors 29,30,31,32, hence the double references for the two castors illustrated. The linear actuators 46 can be used to elevate the upper frame carrying the mattress of the bed relative to the undercarriage. The linear actuators 46 can also be used to elevate the head rest, back rest and leg rest of the bed 48.

Figure 7:
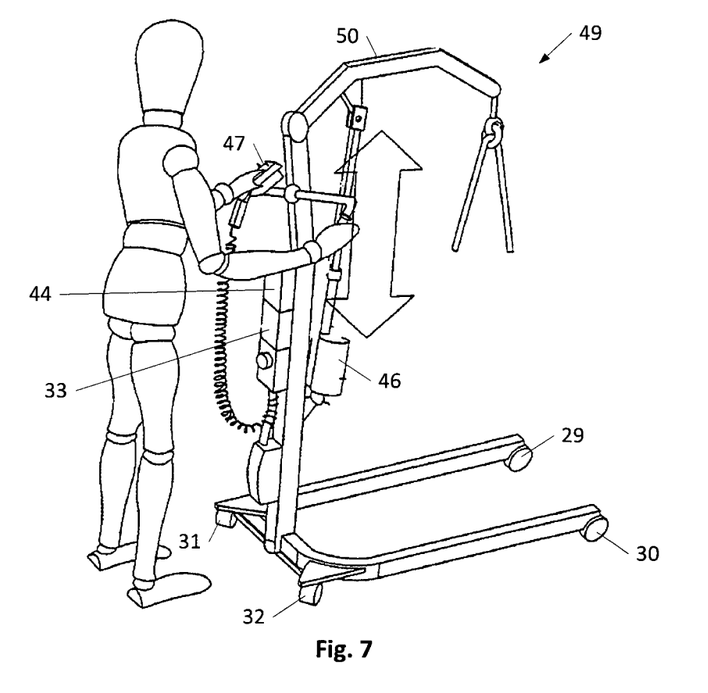
FIG. 7 illustrates a patient lift incorporating the linear actuator system illustrated in FIG. 5.

FIG. 7 illustrates a patient lift 49 incorporating the linear actuator system 43 of FIG. 5. Here, the linear actuator 46 is used to move the arm 50 up and down, so as to lift a patient.

The invention claimed is:

1. A castor comprising: a mounting pin with a vertical rotational axis about which the castor can swivel, at least one wheel rotatable about a horizontal axis, and a manual brake activator cooperating to set the castor in one of
    a directional lock position where the castor cannot swivel about the vertical axis of the mounting pin and the wheel can rotate freely about the horizontal axis,
    a brake position where the wheel cannot rotate about the horizontal axis and where the castor cannot swivel about the vertical axis of the mounting pin, and
    a neutral position where the castor can swivel freely about the vertical axis of the mounting pin and the wheel can rotate freely about the horizontal axis, wherein the manual brake activator is configured to be manually operated to set one of the directional lock position, the brake position, and the neutral position;
    the castor further comprises a servo motor assembly comprising a servo motor, a printed circuit board, a microprocessor, and at least one switch, and where the servo motor is connected to the manual brake activator, wherein the servo motor is configured to operate the manual brake activator to set one of the directional lock position, the brake position, and the neutral position, wherein said switch is arranged in relation to the manual brake activator so as to register a change in the position of the manual brake activator and generate a signal indicative of such position, said switch being connected to said microprocessor for receiving said signal from said switch.

2. The castor according to claim 1, where the servo motor assembly further comprises a motion sensor.

3. A castor control system, comprising: at least a first castor and a second castor wherein at least one of the first and second castors comprise a mounting pin with a vertical rotational axis about which the castor the at least one castor can swivel, at least one wheel rotatable about a horizontal axis, and a manual brake activator cooperating to set the at least one castor in one of (i) a directional lock position where the at least castor cannot swivel about the vertical axis of the mounting pin and the wheel can rotate freely about the horizontal axis, (ii) a brake position where the wheel cannot rotate about the horizontal axis and where the castor cannot swivel about the vertical axis of the mounting pin, and (iii) a neutral position where the at least one castor can swivel freely about the vertical axis of the mounting pin and the wheel can rotate freely about the horizontal axis, wherein the manual brake activator is configured to be manually operated to set one of the directional lock position, the brake position, and the neutral position, the at least one castor further including a servo motor assembly comprising a servo motor, a printed circuit board, a microprocessor, and at least one switch, and where the servo motor is connected to the manual brake activator, wherein the servo motor is configured to operate the manual brake activator to set one of the directional lock position, the brake position, and the neutral position; an electric brake controller connected to the at least one castor, wherein the electric brake controller is connected to a power supply and wherein the electric brake controller is further connected to an operating panel, wherein said switch is arranged in relation to the manual brake activator so as to register a change in the position of the manual brake activator and generate a signal indicative of such position, said switch being connected to said microprocessor for receiving said signal from said switch.

4. The castor control system according to claim 3, wherein the microprocessor of the at least one servo motor assembly is a first microprocessor, and where the electric brake controller comprises a second microprocessor.

5. The castor control system according to claim 3, where the electric brake controller comprises a voltage source detector to determine whether or not the castor control system is connected to a mains voltage configured as a source of electric power.

6. A method for operating a castor control system to control a castor that includes a mounting pin with a vertical rotational axis about which the castor can swivel, a wheel rotatable about a horizontal axis, and a manual brake activator cooperating to set the castor in one of (i) a directional lock position where the at least castor cannot swivel about the vertical axis of the mounting pin and the wheel can rotate freely about the horizontal axis, (ii) a brake position where the wheel cannot rotate about the horizontal axis and where the castor cannot swivel about the vertical axis of the mounting pin, and (iii) a neutral position where the castor can swivel freely about the vertical axis of the mounting pin and the wheel can rotate freely about the horizontal axis, where the castor further includes a servo motor assembly including a servo motor connected to the manual brake activator, a microprocessor, and at least one switch, and wherein the castor control system includes an electric brake controller, the method comprising: detecting, using the microprocessor of the servo motor assembly, via the activating and deactivating of at least one switch by a change in the position of the manual brake activator, one of the directional lock, brake, and neutral positions of the manual brake activator of the castor, and, forwarding, using the microprocessor of the servo motor assembly, information of the detected position of the manual brake activator of the castor to the electric brake controller.

7. The method for operating a castor control system according to claim 6 wherein the castor is a first castor and the castor control system is further configured to control a second castor, said method further comprising: setting, using the electric brake controller, the second castor in the brake position when the manual brake activator of the first castor has been manually set in the brake position.

8. The method for operating a castor control system according to claim 6 wherein the castor is a first castor and the castor control system is further configured to control a second castor, said method further comprising: setting, using the electric brake controller, the second castor in the directional lock position when the manual brake activator of the first castor has been manually set in the directional lock position.

9. The method for operating a castor control system according to claim 6, wherein the castor control system is configured to control plural castors, and where the method further comprises:

detecting, using the microprocessor of the servo motor assembly of one of the castors, via a motion sensor, when the castors are in motion and as detecting, using a voltage source detection, when the castor control system is connected to a mains voltage configured as a source of electric power, setting, using the electric brake controller, the manual brake activator of each of the plural castors in the brake position when any of the castors are in motion at the same time as the castor control system is connected to mains voltage.

10. The castor according to claim 1 wherein the mounting pin is configured to be coupled to a hospital bed or an article of care furniture.

11. The castor control system according to claim 3 wherein the castor is configured to be coupled to a hospital bed or an article of care furniture.

12. The castor according to claim 1, wherein the manual brake activator is configured to be moved when manually operated to set one of the directional lock position, the brake position, and the neutral position, and wherein the servo motor is configured to operate the manual brake activator by moving the manual brake activator to set one of the directional lock position, the brake position, and the neutral position.

13. The castor according to claim 12, wherein the at least one switch comprises a plurality of switches wherein the manual brake activator includes a corresponding plurality of pins configured to engage respective switches, such that a change in one of the directional lock, brake, and neutral positions caused by movement of the manual brake activator is registered by activating and deactivating the plurality of switches.

14. The castor according to claim 1, wherein the at least one switch comprises a plurality of switches wherein the manual brake activator includes a corresponding plurality of pins configured to engage respective switches, such that a change in one of the directional lock, brake, and neutral positions set by the manual brake activator is registered by activating and deactivating the plurality of switches.

15. The method for operating a castor control system according to claim 6, wherein the castor control system is configured to control plural castors that are coupled to an article, said method further comprising:

determining, at a first time, when the castors are set, via a respective manual brake activator, to one of a directional lock position and a neutral position, and when the castors are in motion as determined using a motion sensor;

detecting, at a second time after the first time, when any of the castors have been set to the brake position through the manual operation of an associated manual brake activator; and after the detecting step, restoring the castors to their previous positions as determined at said first time.

* * * * *